US011881180B2

United States Patent
(12) United States Patent
Kim

(10) Patent No.: US 11,881,180 B2
(45) Date of Patent: Jan. 23, 2024

(54) LIGHT-EMITTING DISPLAY DEVICE AND METHOD OF SENSING DEGRADATION THEREOF

(71) Applicant: LG DISPLAY CO., LTD., Seoul (KR)

(72) Inventor: Ha Zoong Kim, Suwon-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/861,519

(22) Filed: Jul. 11, 2022

(65) Prior Publication Data

US 2022/0343864 A1 Oct. 27, 2022

Related U.S. Application Data

(63) Continuation of application No. 17/343,613, filed on Jun. 9, 2021, now Pat. No. 11,436,986.

(30) Foreign Application Priority Data

Jun. 10, 2020 (KR) ........................ 10-2020-0070377

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2300/0819* (2013.01); *G09G 2310/08* (2013.01); *G09G 2320/043* (2013.01)

(58) Field of Classification Search
None
See application file for complete search history.

(56) References Cited

U.S. PATENT DOCUMENTS 10,140,929 B2 * 11/2018 Kim ........................ G01R 15/09
10,297,192 B2 * 5/2019 Lee ...................... G09G 3/3208
(Continued)

FOREIGN PATENT DOCUMENTS

CN 101859536 A 10/2010
CN 103871358 A 6/2014
(Continued)

OTHER PUBLICATIONS

Chinese Office Action dated Oct. 28, 2023 issued in Patent Application No. 202110635445.7 w/English Translation (11 pages).

*Primary Examiner* — Sepehr Azari
(74) *Attorney, Agent, or Firm* — POLSINELLI PC

(57) ABSTRACT

A light-emitting display device includes a display panel including a high-potential power voltage line and a low-potential power voltage line and provided with a plurality of pixels each including a driving transistor and an organic light-emitting diode, a timing controller configured to generate N (N being a natural number) sensing images depending on a size of accumulated image data by accumulating image data for each pixel, and to display the display panel of data of at least one sensing image of the N sensing images on the display panel and to obtain an amount of degradation of organic light-emitting diodes in a sensing mode, and a degradation sensing unit configured to estimate the amount of degradation of the organic light-emitting diodes by sensing an electrical physical quantity for each panel or for each region in a panel in a state in which the at least one sensing image is displayed on the display panel, and to provide the amount of degradation of the organic light-emitting diodes to the timing controller.

18 Claims, 14 Drawing Sheets

(56) References Cited

U.S. PATENT DOCUMENTS

| | | | | |
|---|---|---|---|---|
| 10,388,200 | B2 * | 8/2019 | Moon | G09G 3/006 |
| 11,222,597 | B2 * | 1/2022 | Bong | G09G 3/2092 |
| 11,501,719 | B2 * | 11/2022 | Chon | G09G 3/20 |
| 2001/0022565 | A1 * | 9/2001 | Kimura | G09G 3/3266 345/82 |
| 2003/0127643 | A1 * | 7/2003 | Park | G09G 3/3225 257/40 |
| 2003/0132930 | A1 * | 7/2003 | Kimura | H03F 3/082 345/211 |
| 2003/0214465 | A1 * | 11/2003 | Kimura | G09G 3/3241 345/76 |
| 2009/0051628 | A1 * | 2/2009 | Kwon | G09G 3/3233 345/77 |
| 2009/0244047 | A1 * | 10/2009 | Mizutani | G09G 3/325 345/82 |
| 2013/0221856 | A1 * | 8/2013 | Soto | H05B 45/60 315/152 |
| 2014/0055500 | A1 * | 2/2014 | Lai | G09G 3/006 345/77 |
| 2014/0340436 | A1 * | 11/2014 | Kumeta | G09G 3/3233 345/691 |
| 2016/0133172 | A1 * | 5/2016 | Hwang | G09G 3/3233 324/762.07 |
| 2016/0293109 | A1 * | 10/2016 | Yang | G09G 3/3233 |
| 2016/0343302 | A1 * | 11/2016 | Han | G09G 3/3233 |
| 2017/0067957 | A1 * | 3/2017 | Lee | H05B 45/60 |
| 2018/0075798 | A1 * | 3/2018 | Nho | G09G 3/32 |
| 2018/0182278 | A1 * | 6/2018 | Kim | G09G 3/2018 |
| 2018/0182297 | A1 * | 6/2018 | Lee | G09G 3/3225 |
| 2018/0268752 | A1 * | 9/2018 | Zhuang | G09G 3/2074 |
| 2020/0184887 | A1 * | 6/2020 | Nien | G09G 3/3225 |

FOREIGN PATENT DOCUMENTS

| | | | |
|---|---|---|---|
| CN | 103903560 | A | 7/2014 |
| CN | 206610040 | U | 11/2017 |
| CN | 107978273 | A | 5/2018 |
| CN | 109690666 | A | 4/2019 |
| KR | 10-2015-0080303 | A | 7/2015 |
| KR | 10-2016-0055558 | A | 5/2016 |

* cited by examiner

FIG. 12

| Mode | Dispaly | Sensing |
|---|---|---|
| EL1 | ON | OFF |
| EL2 | OFF | ON |
| Driving region of driving TFT | Saturation | Linear |
| Driving of input end of panel ELVDD | ELVDD voltage driving | i_ELVDD current driving |

LIGHT-EMITTING DISPLAY DEVICE AND METHOD OF SENSING DEGRADATION THEREOF

CROSS-REFERENCE TO RELATED APPLICATION

This application is a continuation of U.S. patent application Ser. No. 17/343,613, filed on Jun. 9, 2021, which claims the priority benefit of Korean Patent Application No. 10-2020-0070377, filed on Jun. 10, 2020, which are hereby incorporated by reference in their entirety for all purposes as if fully set forth herein.

BACKGROUND

Field of the Disclosure

The present disclosure relates to a light-emitting display device capable of performing deterioration compensation by sensing a deterioration rate for each light-emitting display panel or region due to a process variation, and a method for sensing degradation of the light-emitting display device.

Description of the Background

In the information society, lots of technologies in the field of display devices for displaying visual information as an image have been developed. Among the display devices, an organic light-emitting display device displays an image using a self-emissive device such as an organic light-emitting diode.

An organic light-emitting display device has a rapid response speed due to usage of a self-emissive device for emitting light in a light emitting layer through recombination of electrons and holes, and simultaneously, has high luminance and low driving voltage and may be ultra-thin and may be implemented in a free shape, and accordingly, has attracted attention as a next-generation display.

An organic light-emitting display device includes: a display panel including data lines, scan lines, and a plurality of sub-pixels formed at intersections between the data lines and the scan lines; a gate driver for supplying scan signals to the scan lines; and a data driver for supplying data voltages to the data lines.

Each of the sub-pixels includes an organic light-emitting diode and a pixel circuit for independently driving the organic light-emitting diode. The pixel circuit includes a driving transistor for adjusting the amount of current supplied to the organic light-emitting diode depending on voltage of a gate electrode, and a scan transistor for supplying data voltage of a data line to a gate electrode of the driving transistor in response to a scan signal of a scan line.

A threshold voltage of the driving transistor varies for each pixel due to process deviation during manufacture of an organic light-emitting display device or degradation of the driving transistor due to long-term driving. That is, when the same data voltage is applied to pixels, a current supplied to each of the organic light-emitting diode needs to be constant, but even if the same data voltage is applied to pixels, the current supplied to the organic light-emitting diode may change for each pixel due to a difference in the threshold voltage of the driving transistor between pixels. The organic light-emitting diode is also degraded due to long-term driving, and in this case, the brightness of the organic light-emitting diode may change for each pixel. Thus, even if the same data voltage is applied to pixels, the brightness of light emitted from the organic light-emitting diode may change for each pixel. To overcome this, there is provided a compensation method for compensating for a threshold voltage of a driving transistor and degradation of an organic light-emitting diode.

The threshold voltage of the driving transistor and degradation of the organic light-emitting diode are compensated for using an external compensation method. The external compensation method is a method in which a preset data voltage is applied to a pixel, a source voltage of a driving transistor is sensed through a preset sensing line according to the preset data voltage, converting a voltage sensed using an analog-digital converter into sensing data that is digital data, and compensating for digital video data to be supplied to a pixel according to the sensing data.

Such a conventional compensation method compensates for each organic light-emitting diode on the assumption that the same degradation occurs for each display panel or within one display panel.

However, due to the process deviation of the organic light-emitting diode, a degradation rate varies for each display panel or for each region within one display panel, and accordingly when the amount of degradation is calculated and compensated for based on the same standard degradation model, there is a problem in that a compensation error occurs and image sticking occurs.

SUMMARY

Accordingly, the present disclosure is to provide a light-emitting display device and a method for sensing degradation thereof for overcoming a compensation error due to process deviation by estimating a degradation level through sensing an electrical physical quantity for each display panel or for each region in a single panel and compensating for these values for each panel or for each region in a single panel.

In an aspect, the present disclosure provides a light-emitting display device comprising a display panel, a timing controller, and a degradation sensing unit. The display panel includes a high-potential power voltage line, a low-potential power voltage line, and a plurality of pixels each including a driving transistor and an organic light-emitting diode. The timing controller may generate N (N being a natural number) sensing images depending on a size of accumulated image data by accumulating image data for each pixel, display at least one of the N sensing images on the display panel, and obtain an amount of degradation of organic light-emitting diodes in a sensing mode. The degradation sensing unit may estimate the amount of degradation of the organic light-emitting diodes by sensing an electrical physical quantity for each panel or for each region in the display panel in a state in which the at least one sensing image is displayed on the display panel, and provide the amount of degradation of the organic light-emitting diodes to the timing controller.

The image data may be source image data supplied from a host system or compensation image data obtained by compensating for the source image data based on a threshold voltage of a driving transistor of each pixel or electron mobility of the driving transistor of each pixel.

The timing controller may include an accumulative calculator configured to receive source image data from a host system or the compensation image data, and to accumulatively calculate image data for each pixel, an alignment unit configured to compare the accumulated image data calculated by the accumulative calculator and to align pixels in order of size of the accumulated image data, and a generation unit configured to generate a first sensing image by selecting pixels from first to $n^{th}$ (n being a natural number) in size of the accumulated image data among the pixels aligned by the alignment unit, to generate a second sensing image by selecting pixels from $(n+1)^{th}$to $2n^{th}$ in size of the accumulated image data among the pixels aligned by the alignment unit, and to generate an $N^{th}$ sensing image by selecting pixels from $((N-1)n+1)^{th}$ to $Nn^{th}$ in size of the accumulated image data among the pixels aligned by the alignment unit in the same manner.

For generating each sensing image, the generation unit may set a high gradation value to a data value in the selected pixels and may set a black value to a data vale in non-selected pixels.

The timing controller may further include a storage unit configured to store the N sensing images generated by the generation unit, and an output unit configured to read at least one of the N sensing images stored in the storage unit and to provide the read sensing image to a data driver according to control of the timing controller.

The degradation sensing unit may include a first switching device configured to supply a high-potential power voltage to the high-potential power voltage line of the display panel according to a first control signal in a display mode, a voltage/current converter configured to convert the high-potential power voltage into current, a second switching device configured to supply the current converted by the voltage/current converter to the high-potential power voltage line according to a second control signal in the sensing mode, and an analog-digital converter configured to convert a voltage of the high-potential power voltage line of the display panel into a digital signal and to provide the converted digital signal to the timing controller in the sensing mode.

In another aspect, the present disclosure provides a method of sensing degradation of a light-emitting display device including accumulating image data for each pixel, generating N (N being a natural number) sensing images by aligning pixels in order of size of the accumulated image data and selecting a predetermined number of pixels as one image, displaying at least one sensing image among the N sensing images on a display panel, and estimating an amount of degradation of organic light-emitting diodes by sensing an electrical physical quantity for each panel or for each region in a panel in a state in which the at least one sensing image is displayed on the display panel.

The generating the N (N being a natural number) sensing images may include generating a first sensing image by selecting pixels from first to $n^{th}$ (n being a natural number) in size of the accumulated image data among the aligned pixels, generating a second sensing image by selecting pixels from $(n+1)^{th}$ to $2n^{th}$ in size of the accumulated image data among the aligned pixels, generating an $N^{th}$ sensing image by selecting pixels from $((N-1)n+1)^{th}$ to $Nn^{th}$ in size of the accumulated image data among the aligned pixels in the same manner, setting a high gradation value to a data value in selected pixels, and setting a black value to a data vale in non-selected pixels.

The estimating the amount of degradation of the organic light-emitting diodes may include displaying the sensing image by supplying a high-potential power voltage to a high-potential power voltage line of the display panel, and supplying current to the high-potential power voltage line of the display panel and sensing a voltage of the high-potential power voltage line of the display panel.

BRIEF DESCRIPTION OF THE DRAWINGS

The accompanying drawings, which are included to provide a further understanding of the disclosure and are incorporated in and constitute a part of this application, illustrate disclosure(s) of the disclosure and together with the description serve to explain the principle of the disclosure.

In the drawings:

FIG. 12 is a table showing first and second control signals, applied to a degradation sensing unit, a driving region of a driving transistor, and a driving state of a high-potential power voltage line of a display panel depending on a display mode and a second sensing mode in a light-emitting display device according to the present disclosure;

DETAILED DESCRIPTION

Figure 1:
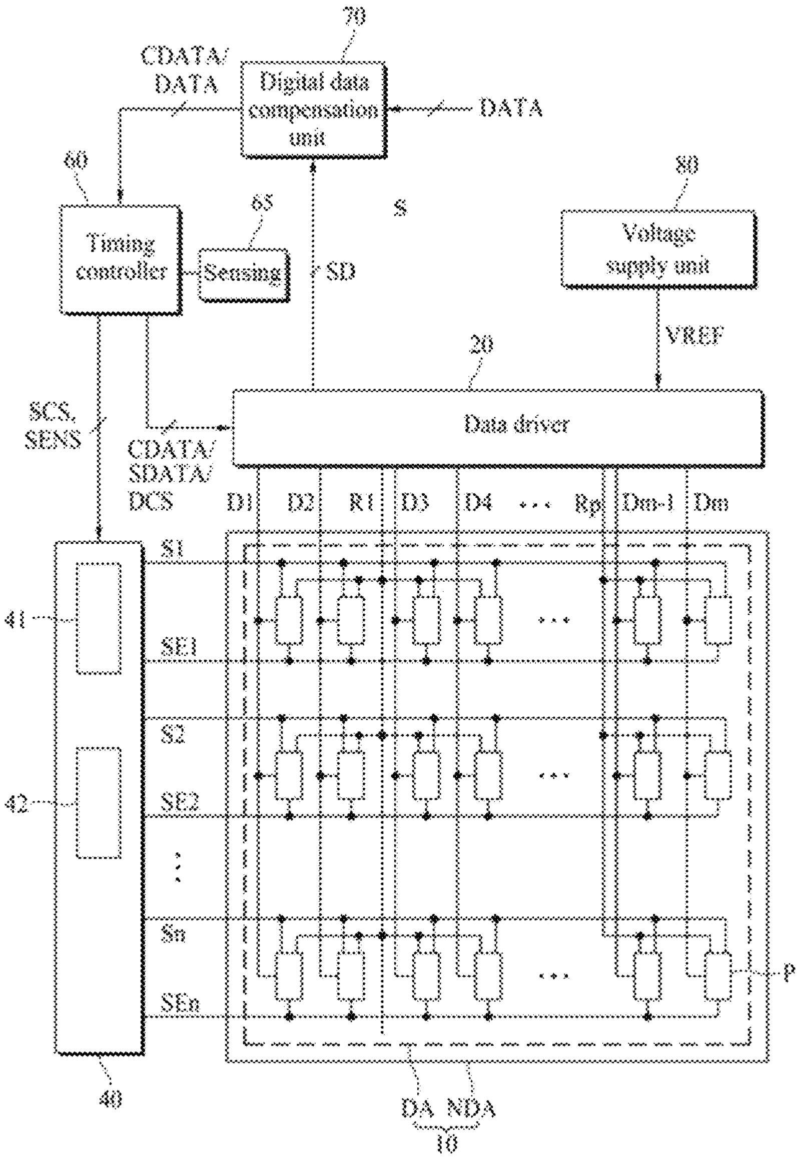
FIG. 1 is a schematic block diagram showing the configuration of a light-emitting display device according to an disclosure of the present disclosure.

The attached drawings for illustrating exemplary disclosures of the present disclosure are to be referred to in order to gain a sufficient understanding of the present disclosure, the merits thereof, and the features accomplished by the implementation of the present disclosure. The present disclosure may, however, be embodied in many different forms, and should not be construed as being limited to the disclosures set forth herein; rather, these disclosures are provided so that this disclosure will be thorough and complete, and will fully convey the concept of the present disclosure to one of ordinary skill in the art.

The shapes, sizes, ratios, angles, numbers and the like disclosed in the drawings for description of various disclosures of the present disclosure to describe disclosures of the present disclosure are merely exemplary and the present disclosure is not limited thereto. Like reference numerals refer to like elements throughout the specification. In the following description of the present disclosure, a detailed description of known related art will be omitted when it is determined that the subject matter of the present disclosure may be unnecessarily obscured.

As used herein, the terms “comprise”, “having,” “including” and the like suggest that other parts may be added unless the term “only” is used. As used herein, the singular forms “a”, “an”, and “the” are intended to include the plural forms as well, unless context clearly indicates otherwise.

Elements in various disclosures of the present disclosure are to be interpreted as including margins of error even without explicit statements.

In describing positional relationships, when an element is referred to as being “on”, “above”, “below”, and “next to” an element, another element may be disposed between the elements unless the term “immediately” or “directly” is explicitly used.

In describing temporal relationships, when an element is referred to as being “after”, “subsequent to”, and “before” an element, the elements may not be continuous unless the term “immediately” or “directly” is explicitly used.

It will be understood that although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure.

The “x-axis direction”, “y-axis direction”, and “z-axis direction” should not be interpreted only as a geometric relationship in which the relationship therebetween is made vertically, and this means that the terms have a wider direction than in the range in which the configuration according to the present disclosure is capable of operating functionally.

The term “at least one” should be understood to include all combinations from one or more related items. For example, the meaning of “at least one of the first item, the second item, and the third item” may mean all combinations of items presented from two or more items of the first item, the second item, and the third item as well as each of the first item, the second item, and the third item.

With regard to the following description of the present disclosure, features of various exemplary disclosures of the present disclosure may be partially or fully combined. As will be clearly appreciated by those skilled in the art, various interactions and operations are technically possible. Various exemplary disclosures may be practiced individually or in combination.

Figure 2:
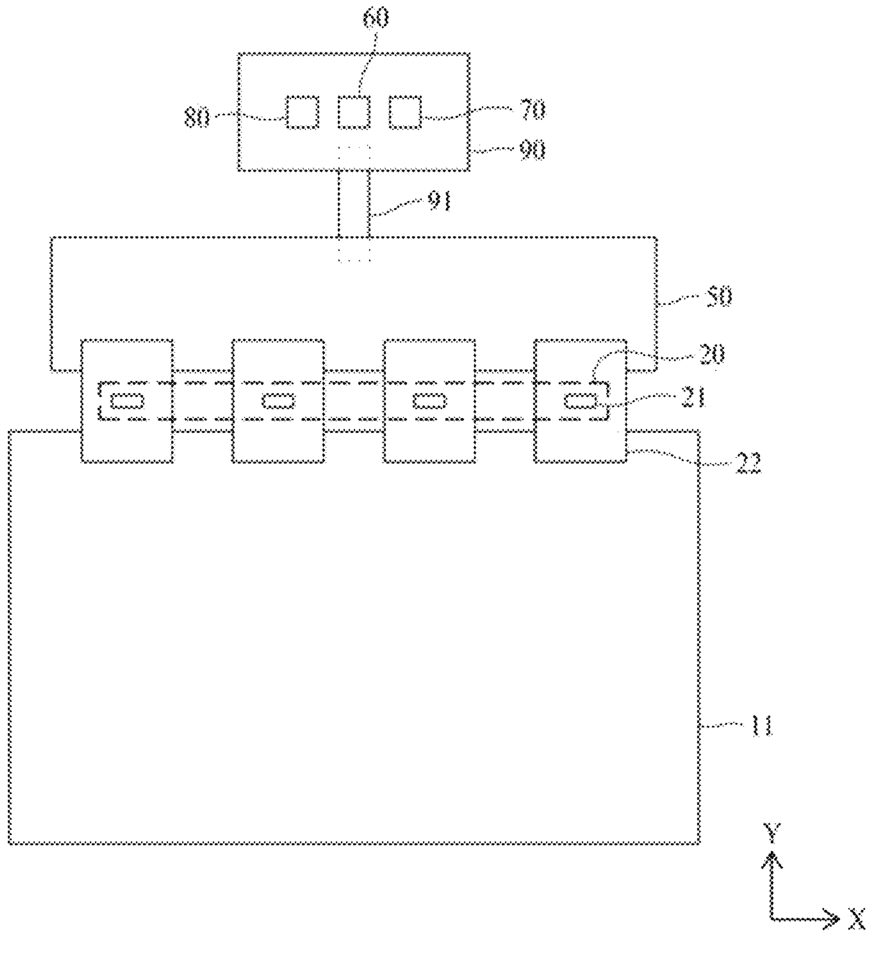
FIG. 2 is a plan view of an organic light-emitting display device according to an disclosure of the present disclosure.
Figure 3:
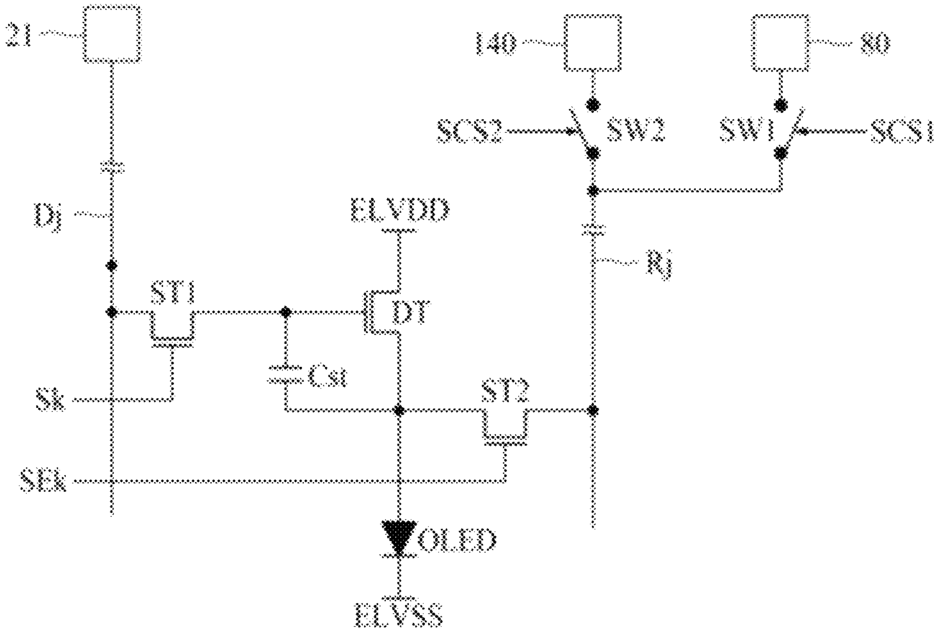
FIG. 3 is a circuit diagram showing a pixel, a source driver IC, a reference voltage generation unit, and an analog-digital converter according to an disclosure of the present disclosure.

Hereinafter, disclosures of the present disclosure will be described in detail with reference to the accompanying drawings FIG. 1 is a block diagram showing the configuration of a light-emitting display device according to an disclosure of the present disclosure. FIG. 2 is a plan view of an organic light-emitting display device according to an disclosure of the present disclosure. FIG. 3 is a circuit diagram showing a pixel, a source driver IC, a reference voltage generation unit, and an analog-digital converter according to an disclosure of the present disclosure.

As shown in FIGS. 1 and 2, the organic light-emitting display device according to an disclosure of the present disclosure may include a display panel 10, a data driver 20, a gate driver 40, a source printed circuit board (S-PCB) 50, a timing controller (T-con) 60, a degradation sensing unit 65, an external compensation circuit (or digital data compensation unit) 70, a reference voltage generator (or voltage supply unit) 80, and a control printed circuit board (CPCB) 90.

The display panel 10 may include a display area DA and a non-display area NDA. The display area DA may be an area in which pixels P are formed to display an image. The non-display area NDA may be an area provided around the display area DA. The display panel 10 may include data lines D1 to Dm (m being a positive integer equal to or greater than 2), reference voltage lines R1 to Rp (p being a positive integer equal to or greater than 2), scan lines S1 to Sn (n being a positive integer equal to or greater than 2), and sensing signal lines SE1 to SEn. The data lines D1 to Dm and the reference voltage lines R1 to Rp may cross the scan lines S1 to Sn and the sensing signal lines SE1 to SEn, respectively. The data lines D1 to Dm and the reference voltage lines R1 to Rp may be arranged in parallel to each other. The scan lines S1 to Sn and the sensing signal lines SE1 to SEn may be arranged in parallel to each other.

Each of the pixels P may be connected to any one of the data lines D1 to Dm, any one of the reference voltage lines R1 to Rp, any one of the scan lines S1 to Sn, and any one of the sensing signal lines SE1 to SEn. The pixels P may be provided on a lower substrate 11 of the display panel 10. Each of the pixels P may include an organic light-emitting diode (OLED) and a plurality of transistors for supplying current to the organic light-emitting diode (OLED).

The data driver 20 may include a plurality of source driver ICs (SDICs) 21. Each of plurality of source driver ICs 21 may receive compensation digital video data CDATA, sensing image data SDATA, and a data timing control signal DCS from the timing controller (T-con) 60. The plurality of source driver ICs (SDICs) 21 may be connected to the data lines D1 to Dm and may supply data voltages to the data lines D1 to Dm. The plurality of source driver ICs (SDICs) 21 may be installed on flexible films 22, respectively.

Each of the flexible films 22 may be a tape carrier package or a chip on film. The flexible films 22 may be curved or bent. Each of flexible films 22 may be attached to the lower substrate 11 and the source printed circuit board (S-PCB) 50. Each of the flexible films 22 may be attached to the lower substrate 11 using a tape automated bonding (TAB) method with an anisotropic conductive film, and thus, the plurality of source driver ICs (SDICs) 21 may be connected to the data lines D1 to Dm. The source printed circuit board (S-PCB) 50 may be connected to the control printed circuit board (CPCB) 90 by a flexible cable 91.

The data driver 20 may be connected to the reference voltage lines R1 to Rp and may sense a threshold voltage of a driving transistor of each pixel P or electron mobility of the driving transistor. The data driver 20 may generate sensing data SD using the sensed voltage and may supply the sensing data SD to the external compensation circuit 70.

The gate driver 40 may include a scan signal output unit 41 and a sensing signal output unit 42.

The scan signal output unit 41 may be connected to the scan lines S1 to Sn. The scan signal output unit 41 may supply scan signals to the scan lines S1 to Sn according to a scan timing control signal SCS input from the timing controller 60.

The sensing signal output unit 42 may be connected to the sensing signal lines SE1 to SEn. The sensing signal output unit 42 may supply sensing signals to the sensing signal lines SE1 to SEn according to a sensing timing control signal SENS input from the timing controller 60.

The scan signal output unit 41 and the sensing signal output unit 42 may include a plurality of transistors and may be formed directly on the non-display area NDA of the display panel 10 using a gate driver in panel (GIP) method. Alternatively, the scan signal output unit 41 and the sensing signal output unit 42 may be formed in the form of a driving chip and may be installed on a flexible film connected to the display panel 10.

The timing controller 60 may receive source image data and timing signals from a host system. The timing signals may include a vertical sync signal, a horizontal sync signal, a data enable signal, and a dot clock. The host system may be any one of system of a computer, a TV system, a set-top box, and a portable terminal such as a tablet or a cellular phone.

The timing controller 60 may perform various types of image processing for correction of image quality and compensation for degradation of a light-emitting device by accumulating source image data.

The timing controller 60 may perform various types of image processing for correction of image quality and compensation for degradation of a light-emitting device by accumulating the compensated image data.

Figure 8:
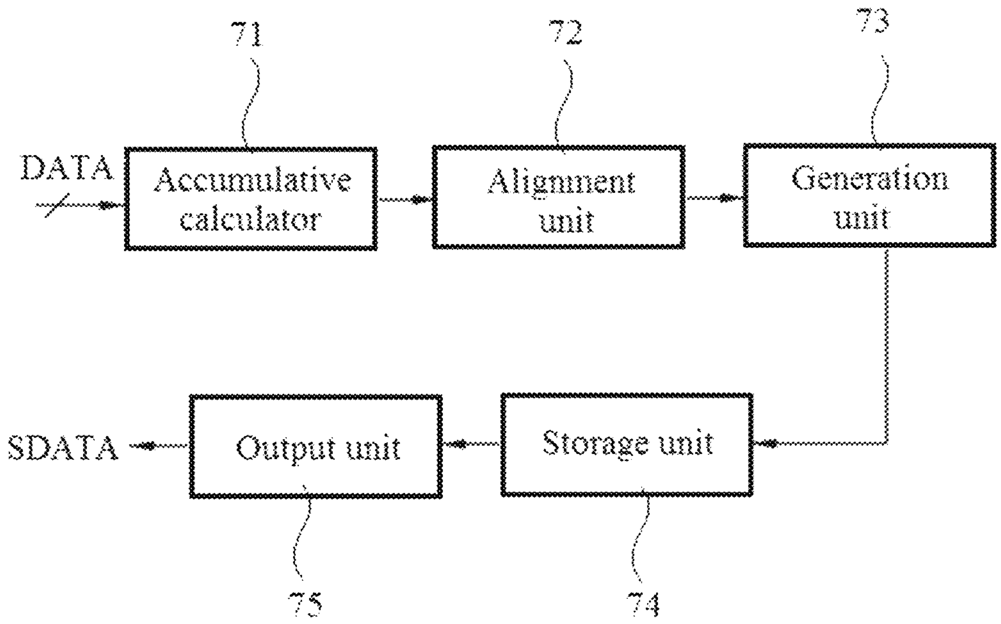
FIG. 8 is a diagram showing the detailed configuration of a timing controller (T-con) for obtaining a degree of degradation of an organic light-emitting diode OLED according to the present disclosure.

In order to estimate a degree of degradation for an entire region or for each region of the display panel 10, the timing controller 60 may accumulate data of each pixel of a display panel from the source image data or the compensated image data, may align the accumulated data in order of a size of the accumulated data for each pixel, may generate N (N is a natural number) sensing image data consisting of pixel blocks having a predetermined number (n, n is a natural number) from the largest accumulated data or generate N (N is a natural number) sensing image data by selecting a predetermined number (n, n is a natural number) of pixels as one image, and may store the N sensed image data in a memory (not shown; refer to a storage unit 74 of FIG. 8).

In order to obtain a degree of degradation for an entire region or for each region of the display panel 10, the timing controller 60 may provide the N sensed image data stored in the memory to the data driver 20, may display each of the N sensed image data on the display panel 10, and may allow the degradation sensing unit 65 to obtain the degree of degradation whenever each of the N sensed image data is displayed. A method for obtaining a degree of degradation whenever each of the N sensed image data is displayed will be described in detail below.

The timing controller 60 may generate timing control signals for controlling operation timing of the data driver 20, the scan signal output unit 41, and the sensing signal output unit 42. The timing control signals may include the data timing control signal DCS for controlling the operation timing of the data driver 20, the scan timing control signal SCS for controlling the operation timing of the scan signal output unit 41, and the sensing timing control signal SENS for controlling the operation timing of the sensing signal output unit 42.

The timing controller 60 may output the compensation digital video data CDATA from the external compensation circuit 70, sensed image data generated from the accumulated data, and the data timing control signal DCS to the data driver 20. The timing controller 60 may output the scan timing control signal SCS to the scan signal output unit 41. The timing controller 60 may output the sensing timing control signal SENS to the sensing signal output unit 42. The timing controller 60 may output switch control signals SCS1 and SCS2 for controlling switches SW1 and SW2 of the data driver 20.

The timing controller 60 may control the organic light-emitting display device according to the present disclosure in any one of a display mode, a first sensing mode for sensing a threshold voltage of a driving transistor or an electron mobility of the driving transistor, and a second sensing mode for sensing degradation of an organic light-emitting diode (OLED).

The display mode may be a mode in which the pixels P emit light by applying data voltages based on the compensation image data CDATA to the pixels P.

In the first sensing mode, a threshold voltage of a driving transistor of each of the pixels P or an electron mobility of the driving transistor may be sensed through the reference voltage lines R1 to Rp connected to the pixels P, respectively.

In the second sensing mode, data voltages based on the N sensed image data SDATA generated from accumulated data may be supplied to and displayed on the pixels P through the data driver 20, and a degree of degradation that is a degradation level of an OLED for each panel or for each region in a panel may be estimated by sensing an electrical physical quantity (ELVDD current/voltage) and converting the same into a digital signal. A compensation error due to process deviation of an OLED may be overcome by applying the estimated degradation value for each panel or for each region in a panel. According to the present disclosure, only a method of estimating (sensing) a degree of degradation based on the N pieces of sensing image data SDATA is described.

The first and second sensing modes may be performed before the organic light-emitting display device is powered off, may be performed as soon as the organic light-emitting display device is powered on, or may be performed at a predetermined cycle in the state in which the organic light-emitting display device is powered on.

The external compensation circuit 70 may generate compensation image data by compensating for source image data based on the sensing data SD acquired by sensing the threshold voltage of the driving transistor or the electron mobility of the driving transistor. The external compensation circuit 70 may output the compensation digital video data CDATA to the timing controller 60.

The external compensation circuit 70 may include a memory for storing the sensing data SD. The memory of the external compensation circuit 70 may be a non-volatile memory such as an electrically erasable programmable read-only memory (EEPROM). The external compensation circuit 70 may be installed in the timing controller 60.

The reference voltage generator 80 may generate a reference voltage and may supply the same to the plurality of source driver ICs (SDICs) 21. The reference voltage generator 80 may generate a low voltage or a high voltage for setting a sensing voltage range in the sensing mode. The reference voltage generator 80 may generate driving voltages required to drive the organic light-emitting display device according to the present disclosure other than the reference voltage and may supply the generated voltages to components that require the voltages.

The degradation sensing unit 65 may estimate (sense) the amount of degradation by providing at least one of the N sensed image data SDATA generated by the timing controller 60 to the data driver 20, and sensing an electrical physical quantity (ELVDD current/voltage) for each panel or for each region in a panel and converting the sensed data into a digital signal in the state in which a sensed image is displayed on a display panel.

The detailed configuration of the degradation sensing unit 65 will be described below.

The timing controller 60, the external compensation circuit 70, and the reference voltage generator 80 may be installed on the control printed circuit board (CPCB) 90. The control printed circuit board (CPCB) 90 may be connected to the source printed circuit board (S-PCB) 50 by the flexible cable 91.

The organic light-emitting display device according to an disclosure of the present disclosure may convert source image video data DATA into the compensation digital video data CDATA using the sensing data SD acquired by sensing the threshold voltage of the driving transistor or the electron mobility of the driving transistor in the first sensing mode. As a result, according to the present disclosure, the threshold voltage of the driving transistor of each of the pixels P and the electron mobility of the driving transistor of each of the pixels P may be compensated for.

FIG. 3 is a circuit diagram showing the pixel P, the SDIC 21, the reference voltage generator 80, and an analog-digital converter (ADC) 140 according to an disclosure of the present disclosure.

For convenience of description, FIG. 3 illustrates only a pixel, the SDIC 21, the reference voltage generator 80, the ADC 140, a first switch SW1, and a second switch SW2 that are connected to a $j^{th}$ (j being a positive integer satisfying $1 \le j \le m$) data line Dj, a $j^{th}$ reference voltage line Rj, a $k^{th}$ (k being a positive integer satisfying $1 \le k \le n$) scan line Sk, and a $k^{th}$ sensing signal line SEk.

Referring to FIG. 3, the pixel P may include an organic light-emitting diode OLED, a driving transistor DT, first and second switching transistors ST1 and ST2, and a storage capacitor Cst.

The organic light-emitting diode OLED may emit light according to current supplied through the driving transistor DT. The organic light-emitting diode OLED may include an anode, a hole transporting layer, an organic light emitting layer, an electron transporting layer, and a cathode. In the organic light-emitting diode OLED, when a voltage is applied to the anode and the cathode, the hole and the electron may be moved to the organic light emitting layer through the hole transporting layer and the electron transporting layer, respectively, and may be coupled to each other to emit light in the organic light emitting layer. The anode of the organic light-emitting diode OLED may be connected to a source electrode of the driving transistor DT, and the cathode may receive a low-potential power voltage ELVSS lower than a high-potential power voltage ELVDD.

The driving transistor DT may adjust current flowing to the organic light-emitting diode OLED from a line of the high-potential power voltage ELVDD depending on a difference voltage between the gate electrode and the source electrode thereof. The gate electrode of the driving transistor DT may be connected to a first electrode of the first switching transistor ST1, the source electrode of the driving transistor DT may be connected to the anode of the organic light-emitting diode OLED, and the drain electrode of the driving transistor DT may be connected to a high-potential power voltage line ELVDD.

The first switching transistor ST1 may be turned on according to a $k^{th}$ scan signal of the $k^{th}$ scan line Sk to connect the $j^{th}$ data line Dj to the gate electrode of the driving transistor DT. A gate electrode of the first switching transistor T1 may be connected to the $k^{th}$ scan line Sk, the first electrode of the first switching transistor T1 may be connected to a gate electrode of the driving transistor DT, and a second electrode of the first switching transistor T1 may be connected to the $j^{th}$ data line Dj.

The second switching transistor ST2 may be turned on according to a sensing signal of the $k^{th}$ sensing signal line SEk to connect the $j^{th}$ reference voltage line Rj to a source electrode of the driving transistor DT. A gate electrode of the second switching transistor ST2 may be connected to the $k^{th}$ sensing signal line SEk, the first electrode of the second switching transistor ST2 may be connected to the $j^{th}$ reference voltage line Rj, and the second electrode of the second switching transistor ST2 may be connected to a source electrode of the driving transistor DT.

The first electrode of each of the first and second switching transistors ST1 and ST2 may be a source electrode, and the second electrode of each of the first and second switching transistors ST1 and ST2 may be a drain electrode, but it may be noted that the present disclosure is not limited thereto. That is, the first electrode of each of the first and second switching transistors ST1 and ST2 may be a drain electrode, and the second electrode of each of the first and second switching transistors ST1 and ST2 may be a source electrode.

The storage capacitor Cst may be formed between the gate electrode and the source electrode of the driving transistor DT. The storage capacitor Cst may store a differential voltage between the gate voltage and the source voltage of the driving transistor DT.

The driving transistor DT and the first and second switching transistors ST1 and ST2 may each be formed as a thin film transistor. FIG. 3 illustrates the case in which the driving transistor DT and the first and second switching transistors ST1 and ST2 take the form of an N-type metal oxide semiconductor field effect transistor (MOSFET), but it may be noted that the present disclosure is not limited thereto. The driving transistor DT and the first and second switching transistors ST1 and ST2 may each be a P-type MOSFET.

The SDIC 21 may convert the compensation image data (or compensation digital video data) CDATA into data voltages according to the data timing control signal DCS and may supply the same to the data line Dj in the display mode. The display mode may be a mode in which the pixels P emit light to display an image. The data voltage may be a voltage for emitting light with a predetermined brightness in the organic light-emitting diode OLED of the pixel P.

The SDIC 21 may convert the sensing image data SDATA into a sensing data voltage according to the data timing control signal DCS and may supply the same to the data lines Dj in the sensing mode.

The first sensing mode may be any one of a threshold voltage compensation mode for sensing a source voltage of the driving transistor DT in order to compensate for the threshold voltage of the driving transistor of each of the pixels P, and a mobility compensation mode for sensing a source voltage of the driving transistor DT in order to compensate for the electron mobility of the driving transistor of each of the pixels P.

The ADC 140 may convert voltage sensed from the reference voltage line Rj into the sensing data SD that is digital data and may output the same to the external compensation circuit 70 in the first sensing mode.

The first switch SW1 may be connected between the reference voltage lines Rj and the reference voltage generator 80 and may switch connection between the reference voltage lines Rj and the reference voltage generator 80. The first switch SW1 may be turned on and off according to a first switch control signal SCS1 output from the timing controller 60. When the first switch SW1 is turned on according to the first switch control signal SCS1, the reference voltage line Rj may be connected to the reference voltage generator 80, and thus the reference voltage generated by the reference voltage generator 80 may be supplied to the reference voltage line Rj.

The second switches SW2 may be connected between the reference voltage line Rj and the ADC 140, and may switch connection between the reference voltage line Rj and the ADC 140. The second switches SW2 may be turned on and off according to a second switch control signal SCS2 output from the timing controller 60. When the second switches SW2 are turned on according to the second switch control signal SC S2, the reference voltage line Rj may be connected to the ADC 140, and thus the threshold voltage of the driving transistor of each of the pixels P may be sensed through each of the reference voltage line Rj.

Figure 4:
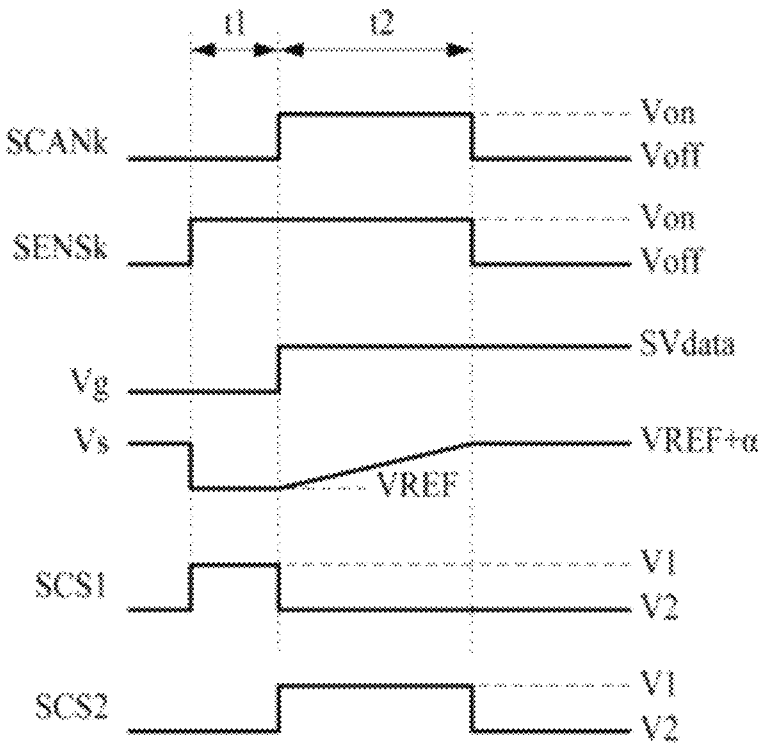
FIG. 4 is a waveform diagram showing a scan signal, a sensing signal, a first switch control signal, a second switch control signal, a gate voltage, and a source voltage which are supplied to a pixel in a first sensing mode according to the present disclosure.

FIG. 4 is a waveform diagram showing a scan signal SCANk, a sensing signal SENSk, the first switch control signal SCS1, the second switch control signal SCS2, a gate voltage Vg, and a source voltage Vs which are supplied to the pixel P in the first sensing mode.

In the first sensing mode, one frame period may include first and second periods t1 and t2. The first period t1 may be a time taken to initialize the source electrode of the driving transistor DT to a reference voltage VREF. The second period t2 may be a time taken to apply a sensing data voltage SVdata to the gate electrode of the driving transistor DT and to sense the source voltage of the driving transistor DT.

The $k^{th}$ scan signal SCANk of the $k^{th}$ scan line Sk may be supplied as a gate on voltage Von during the second period t2. Although an example in which the $k^{th}$ scan signal SCANk of the $k^{th}$ scan line Sk is supplied as a gate off voltage Voff during the first period t1 has been described, the $k^{th}$ scan signal SCANk may also be supplied as the gate on voltage Von. The $k^{th}$ sensing signal SENSk of the $k^{th}$ sensing signal line SEk may be supplied as the gate on voltage Von during the first and second periods t1 and t2. The first and second switching transistors ST1 and ST2 of the pixel P may be turned on according to the gate on voltage Von and may be turned off according to the gate off voltage Voff.

The first switch control signal SCS1 may be supplied as a first logic level voltage V1 during the first period t1 and may be supplied as a second logic level voltage V2 during the second period t2. The second switch control signal SCS2 may be supplied as the second logic level voltage V2 during the first period t1 and may be supplied as the first logic level voltage V1 during the second period t2. Each of the first and second switches SW1 and SW2 may be turned on according to a first logic level voltage and may be turned off according to a second logic level voltage.

Figure 5:
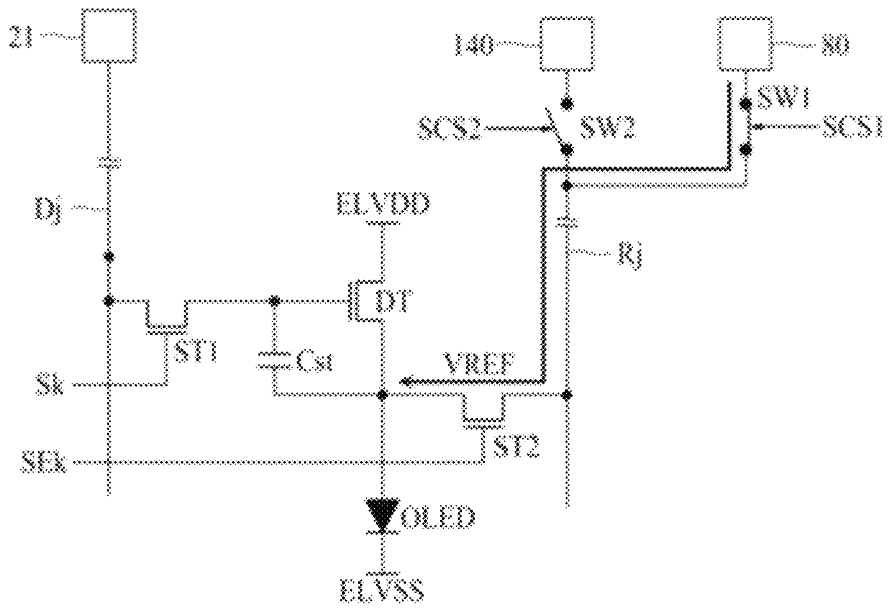
FIG. 5 is a circuit diagram of FIG. 3 illustrating a driving state in a first period of FIG. 4.

FIG. 5 is a circuit diagram of FIG. 3 illustrating a driving state in the first period of FIG. 4.

The first switching transistor ST1 may be turned off according to the $k^{th}$ scan signal SCANk of the gate off voltage Voff supplied to the $k^{th}$ scan line Sk during the first period t1. The second switching transistor ST2 may be turned on according to the $k^{th}$ sensing signal SENSk of the gate on voltage Von supplied to the $k^{th}$ sensing signal line SEk. The first switch SW1 may be turned on according to the first switch control signal SCS1 of the first logic level voltage V1 during the first period t1. The second switch SW2 may be turned off according to the second switch control signal SCS2 of the second logic level voltage V2.

Because the first switch SW1 is turned on during the first period t1, the reference voltage VREF may be supplied to the $j^{th}$ reference voltage line Rj from the reference voltage generator 80. Because the second switching transistor ST2 is turned on during the first period t1, the reference voltage VREF of the $j^{th}$ reference voltage line Rj may be supplied to the source electrode of the driving transistor DT. That is, the source electrode of the driving transistor DT may be initialized to the reference voltage VREF.

Figure 6:
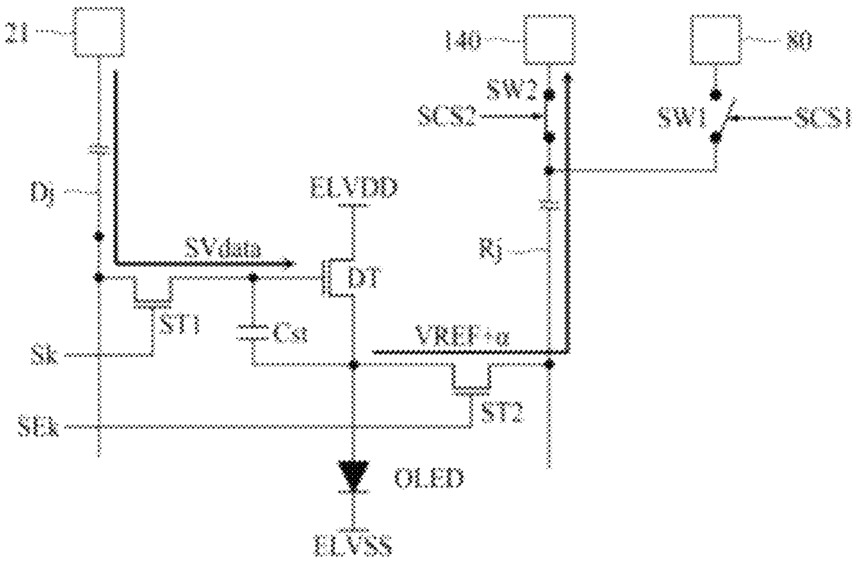
FIG. 6 is a circuit diagram of FIG. 3 illustrating a driving state in a second period of FIG. 4.

FIG. 6 is a circuit diagram of FIG. 3 illustrating a driving state in the second period of FIG. 4.

During the second period t2, the first switching transistor ST1 may be turned on according to the $k^{th}$ scan signal SCANk of the gate on voltage Von supplied to the $k^{th}$ scan line Sk. The second switching transistor ST2 may be turned on according to the $k^{th}$ sensing signal SENSk of the gate on voltage Von supplied to the $k^{th}$ sensing signal line SEk. During the second period t2, the first switch SW1 may be turned off according to the first switch control signal SCS1 of the second logic level voltage V2. The second switch SW2 may be turned on according to the second switch control signal SCS2 of the first logic level voltage V1.

Because the first switch SW1 is turned off during the second period t2, the reference voltage VREF may not be supplied to the $j^{th}$ reference voltage line Rj. Because the second switch SW2 is turned on during the second period t2, the $j^{th}$ reference voltage line Rj may be connected to the ADC 140. Because the first switching transistor ST1 is turned on during the second period t2, the sensing data voltage SVdata may be supplied to the gate electrode of the driving transistor DT. Because the second switching transistor ST2 is turned on during the second period t2, the source electrode of the driving transistor DT may be connected to the ADC 140 through the $j^{th}$ reference voltage line Rj.

Because a voltage difference Vgs (Vgs=SVdata−VREF) between the gate electrode and the source electrode of the driving transistor DT is greater than the threshold voltage Vth of the driving transistor DT during the second period t2, the driving transistor DT may allow current to flow.

The source voltage of the driving transistor DT may rise to "VREF+α". α may vary according to the threshold voltage of the driving transistor DT and the electron mobility of the driving transistor DT. Thus, a voltage obtained by reflecting the threshold voltage of the driving transistor DT or the electron mobility of the driving transistor DT may be sensed in the source electrode of the driving transistor DT during the second period t2.

Figure 7:
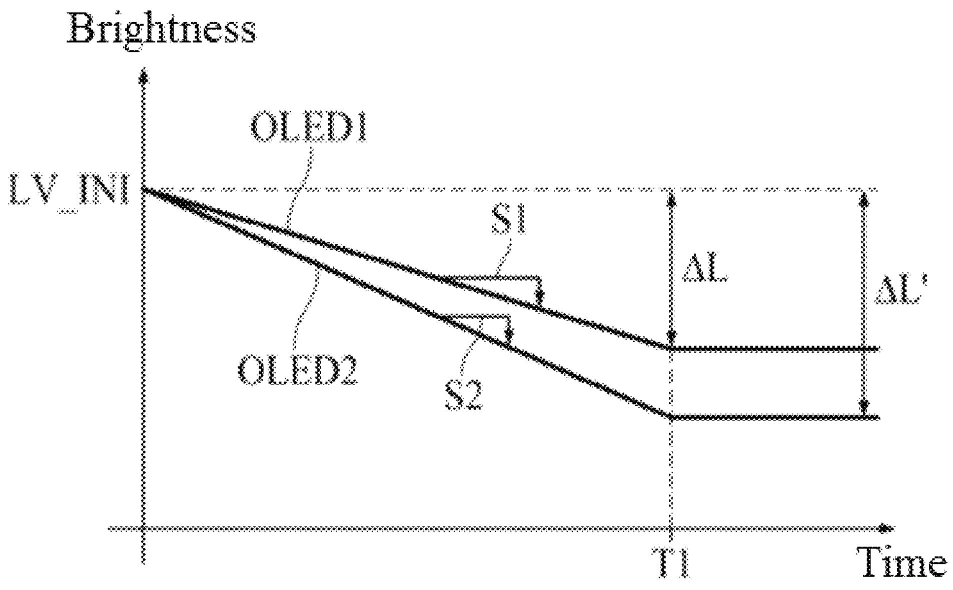
FIG. 7 is a graph showing a variation in brightness of each of organic light-emitting diodes according to time for explaining a second sensing mode in an organic light-emitting display device according to the present disclosure.

FIG. 7 is a graph showing a variation in brightness of each of organic light-emitting diodes according to time for explaining a second sensing mode in an organic light-emitting display device according to the present disclosure.

In FIG. 7, first and second organic light-emitting diodes OLED1 and OLED2 are exemplified.

The brightness of the first organic light-emitting diode OLED1 decreases over time like in the case in which an organic light-emitting diode is degraded at a standard degradation rate that is a degradation rate predicted in a standard OLED degradation model.

The brightness of the second organic light-emitting diode OLED2 decreases over time at higher speed than the standard degradation rate that is the degradation rate predicted in the standard OLED degradation model.

The second organic light-emitting diode OLED2 may be an organic light-emitting diode OLED provided in a region that is easily degraded due to design thereof or defects of an internal organic light emitting layer or that is used with high brightness compared with other regions on the display panel 10 or is maintained in a turn-on state during a relatively long time and is rapidly degraded. After a first driving time T1 elapses, a brightness reduction amount ΔL' of the second organic light-emitting diode OLED2 compared with initial brightness LV_INI due to degradation thereof may be greater than a brightness reduction amount ΔL of the first organic light-emitting diode OLED1 due to degradation thereof.

In general, a degradation rate of an organic light-emitting diode may differ for each display panel 10 due to process deviation of an organic light-emitting diode OLED and may also differ for each region in the single display panel 10. Thus, when degradation compensation is performed by estimating a degree of degradation of the plurality of display panels 10 or a plurality of regions in the single display panel 10 using a degradation rate model represented by one standard degradation rate, the amount of degradation estimated in the degradation model may be different from an actual degree of degradation of the display panel 10. When there is a difference in degree of degradation, a degradation compensation error may occur and image sticking may also occur after degradation is compensated for.

Accordingly, a method of estimating a degree of degradation of the organic light-emitting diode OLED by supplying data voltages to the data driver 20 according to N pieces of sensing image data SDATA generated from accumulated data to display a sensing image in the second sensing mode and sensing a degradation level of an OLED as an electrical physical quantity (ELVDD current/voltage) for each panel or for each region in a panel will be described below.

Figure 9:
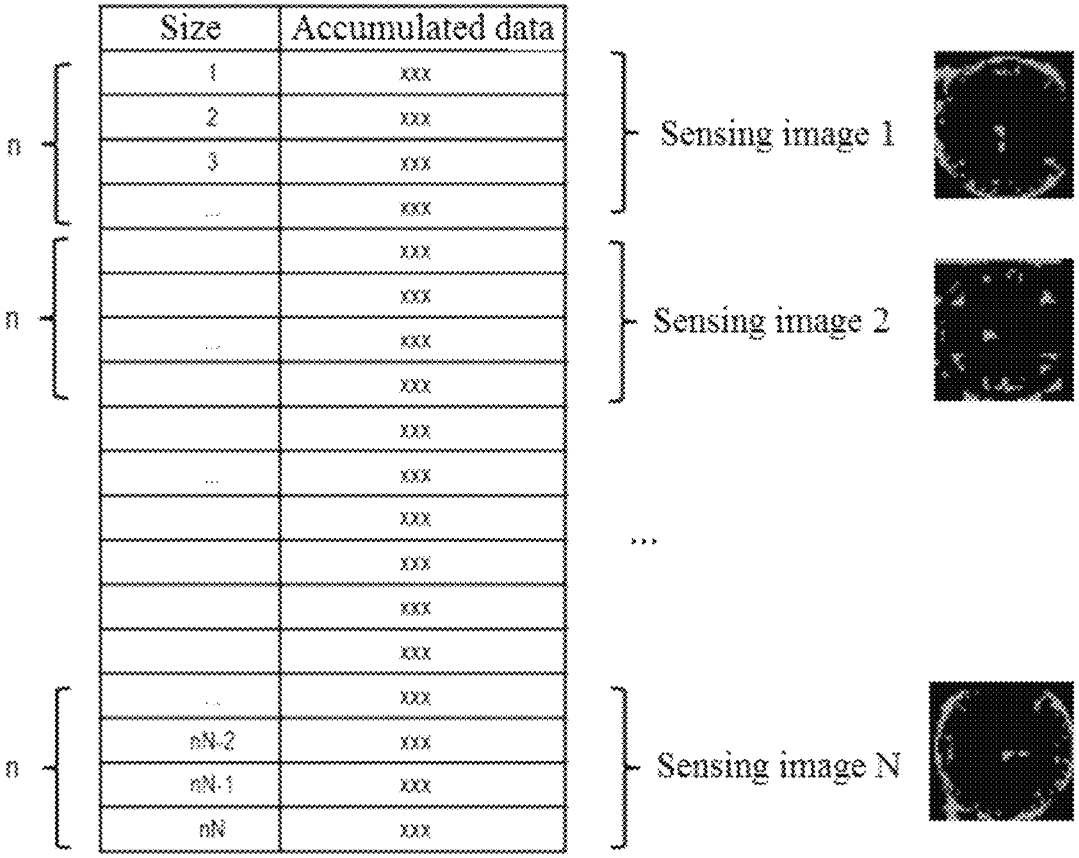
FIG. 9 is a table for explaining a method of selecting a sensing image according to the present disclosure.
Figure 10:
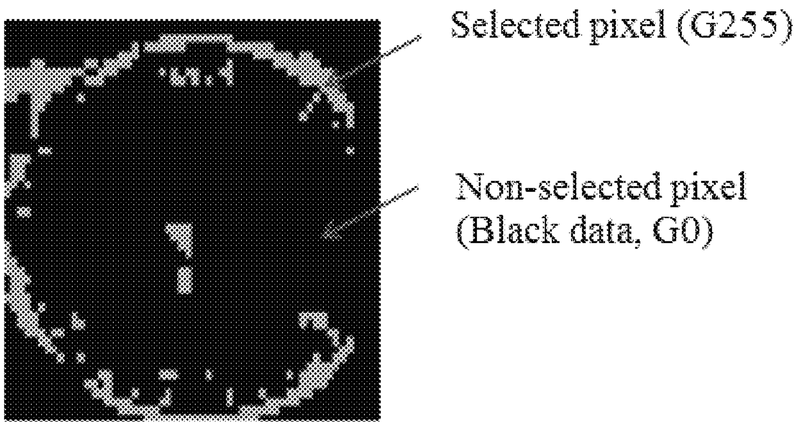
FIG. 10 is a diagram for explaining a method of generating sensing image data according to the present disclosure.

FIG. 8 is a diagram showing the detailed configuration of the timing controller 60 for obtaining a degree of degradation of an organic light-emitting diode OLED according to the present disclosure. FIG. 9 is a table for explaining a method of selecting a sensing image according to the present disclosure. FIG. 10 is a diagram for explaining a method of generating sensing image data according to the present disclosure.

As shown in FIG. 8, the timing controller 60 may include an accumulative calculator 71 for receiving source image data from a host system and accumulatively calculating source image data for each pixel, an alignment unit 72 for aligning the accumulated image data calculated by the accumulative calculator 71 in order of size of the accumulated image data for each pixel, a generation unit 73 for generating N (N being a natural number) sensing images (or sensing image data) using a predetermined number n (n being a natural number) of pixels as one block from the accumulated image data having the largest size in order used for alignment of the alignment unit 72, the storage unit 74 for storing the N sensing image data generated by the generation unit 73, and an output unit 75 for sequentially outputting the N sensing image SDATA stored in the storage unit 74 to the data driver 20.

Here, operations of the alignment unit 72 and the generation unit 73 will be described below in more detail.

That is, as shown in FIG. 9, the alignment unit 72 may align the accumulated image data for each pixel in order from largest to smallest in the size of the accumulated image data. The generation unit 73 may select a first sensing image as accumulated image data from the first to the $n^{th}$ in size of the accumulated image data. The generation unit 73 may select a second sensing image as accumulated image data from the $(n+1)^{th}$ to the $2n^{th}$ in size of the accumulated image data. In the same manner, the generation unit 73 may select an $N^{th}$ sensing image as accumulated data from the $((N-1)n+1)^{th}$ to the $Nn^{th}$ in size of the accumulated image data.

As shown in FIG. 10, in each selected sensing image, N sensing image data may be generated by setting a high gradation G255 value to a data value in the selected pixel and setting a black GO value to a data value in the non-selected pixels.

Figure 11:
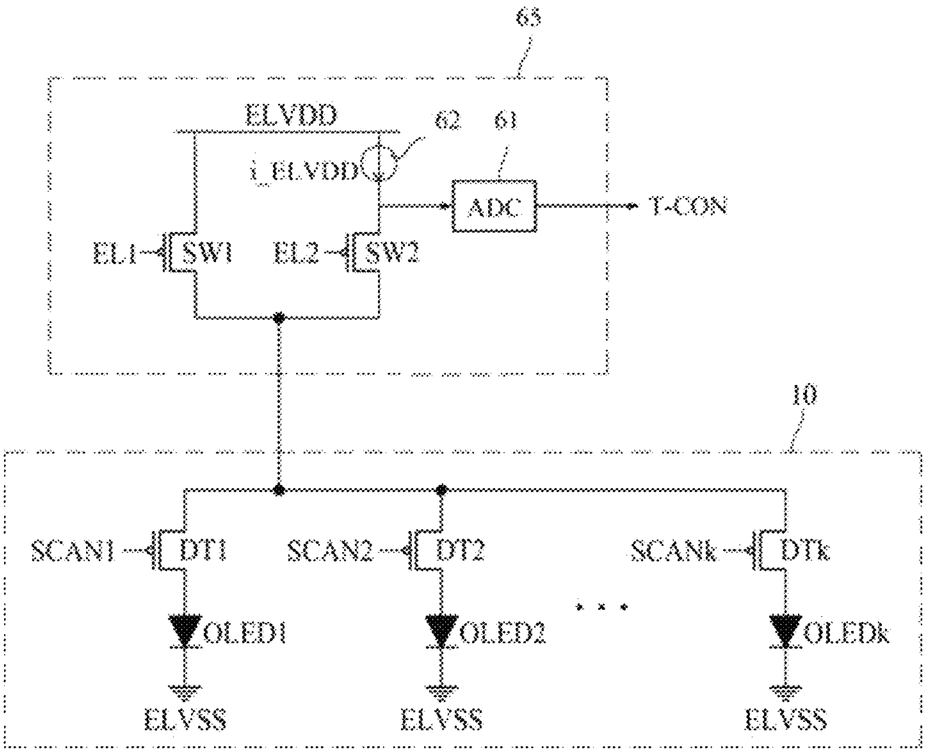
FIG. 11 is a circuit diagram of a degradation sensing unit of a light-emitting display device according to the present disclosure.

FIG. 11 is a circuit diagram of a degradation sensing unit of a light-emitting display device according to the present disclosure. FIG. 12 is a table showing first and second control signals EL1 and EL2 applied to a degradation sensing unit, a driving region of a driving transistor, and a driving state of a high-potential power voltage line of a display panel depending on a display mode and a second sensing mode in a light-emitting display device according to the present disclosure.

The degradation sensing unit 65 may estimate (sense) a degree of degradation by sensing an electrical physical quantity (ELVDD current/voltage) for each panel or for each region in a panel and converting the same into a digital signal in the state in which a sensing image is displayed on a display panel.

Accordingly, as shown in FIG. 11, the degradation sensing unit 65 may include a first switching device SW1 for supplying the high-potential power voltage ELVDD to a high-potential power voltage line of the display panel 10 according to the first control signal EL1 in the display mode, a voltage/current converter 62 for converting the high-potential power voltage ELVDD into current i_ELVDD, a second switching device SW2 for supplying the high-potential current i_ELVDD to the high-potential power voltage line of the display panel 10 according to the second control signal EL2 in the second sensing mode, and an analog-digital converter (ADC) 61 for converting a voltage of the high-potential power voltage line of the display panel 10 into a digital signal and supplying the same to the timing controller 60 in the second sensing mode. In FIG. 11, the anodes of the first to kth organic light-emitting diodes OLED1 to OLEDk are connected with the first to kth driving transistors DT1 to DTk respectively. As an example, the present disclosure may sequentially display the N sensing images on the display panel; and estimate the amount of degradation of N organic light-emitting diodes by sensing an electrical physical quantity for each panel or for each region in a panel in a state in which each sensing image is displayed.

As shown in FIG. 12, in the display mode, the first switching device SW1 controlled according to the first control signal EL1 may be turned on, and the second switching device SW2 controlled according to the second control signal EL2 may be turned off.

In the sensing mode, the first switching device SW1 controlled according to the first control signal EL1 may be turned off, and the second switching device SW2 controlled according to the second control signal EL2 may be turned on.

In the display mode, the driving transistor DT of each of the pixels P may be driven in a saturation region according to a high-potential power voltage ELVDD applied to the high-potential power voltage line of the display panel 10 through the first switching device SW1.

In the sensing mode, the current i_ELVDD supplied to the high-potential power voltage line of the display panel 10 through the second switching device SW2 is sufficiently small, and thus the driving transistor DT of each of the pixels P of the display panel 10 may be driven in a linear region.

As for the driving of input end of panel ELVDD, in the display mode, the display panel may be voltage-driven according to the high-potential power voltage ELVDD, and in the sensing mode, the display panel may be current-driven according to the current i_ELVDD.

In the sensing mode, the display panel 10 displays a sensing image, and thus only selected pixels (driving transistors) selected to generate sensing image data may be turned on and the remaining non-selected pixels may be turned off.

A method (sensing mode) of generating N sensing image data and sensing the amount of degradation of an OLED as described above will be described below in more detail.

The accumulative calculator 71 of the timing controller 60 may receive source image data from a host system and may accumulatively calculate source image data for each pixel.

According to another disclosure, the accumulative calculator 71 may receive compensation image data obtained by compensating for a source image based on the threshold voltage of the driving transistor or the electron mobility of the driving transistor by the external compensation circuit 70 instead of the source image data from the host system and may accumulatively calculate compensation image data for each pixel.

The alignment unit 72 may compare the accumulated compensation image data calculated by the accumulative calculator 71 and may align pixels in order of size of the accumulated compensation image data. That is, as described with reference to FIG. 9, pixels may be aligned in order from largest to smallest in a size of the accumulated image data.

The generation unit 73 may select pixels from the first to the nth in the size of the accumulated image data among pixels aligned by the alignment unit 72 and may generate a first sensing image. The generation unit 73 may select pixels from the $(n+1)^{th}$ to $2n^{th}$ in the size of the accumulated image data among pixels aligned by the alignment unit 72 and may generate a second sensing image. In the same manner, the generation unit 73 may select pixels from the $((N-1)n+1)^{th}$ to the $Nn^{th}$ in the size of the accumulated image data among pixels aligned by the alignment unit 72 and may generate an $N^{th}$ sensing image.

As shown in FIG. 10, in each of the generated sensing image, N sensing image data may be generated by setting a high gradation G255 value to a data value in the selected pixel and setting a black GO value to a data value in the non-selected pixels.

The generated N sensing image data may be stored in the storage unit 74.

The timing controller 60 may control the output unit 75 in the second sensing mode for sensing degradation of the organic light-emitting diode OLED.

The output unit 75 may read at least one of the N sensing image data stored in the storage unit 74 and may provide the same to the data driver 20.

The data driver 20 may display the sensing image data output from the output unit 75 on the display panel 10.

That is, the timing controller 60 may turn on the first switching device SW1 of the degradation sensing unit 65 according to the first control signal EL1 to supply the high-potential power voltage ELVDD to the high-potential power voltage line of the display panel 10 and may control the data driver 20 to supply the sensing image data to the data lines of the display panel 10 and to display the corresponding sensing image.

Needless to say, as shown in FIG. 1, when the sensing image is displayed, the scan signal output unit 41 and the sensing signal output unit 42 of the gate driver 40 may supply scan signals to the scan lines S1 to Sn and may supply sensing signals to the sensing signal lines SE1 to SEn according to control of the timing controller 60.

As described above, the sensing image may be displayed on the display panel 10, and the timing controller 60 may turn off the first switching device SW1 of the degradation sensing unit 65 according to the first control signal EL1 and may turn on the second switching device SW2 of the degradation sensing unit 65 according to the second control signal EL2.

Thus, because the current i_ELVDD is supplied to the high-potential power voltage line of the display panel 10 through the second switching device SW2 and is sufficiently small, the driving transistor DT of each of the pixels P of the display panel 10 may be driven in a linear region.

In this case, the ADC 61 may convert a voltage of the high-potential power voltage line of the display panel 10 into a digital signal and may provide the converted digital signal as the amount of degradation of an OLED to the timing controller 60.

In this process, the output unit 75 may sequentially provide the N sensing image data stored in the storage unit 74 to the data driver 20 and may sense the amount of degradation of an OLED for each sensing image while displaying each sensing image.

In the light-emitting display device and the method of sensing degradation thereof according to the present disclosure as described above, sensing value distribution between sensing images may increase and a sensing value difference between the sensing images is high, and thus a degradation sensing error may be reduced compared with a comparative example.

Figure 13:
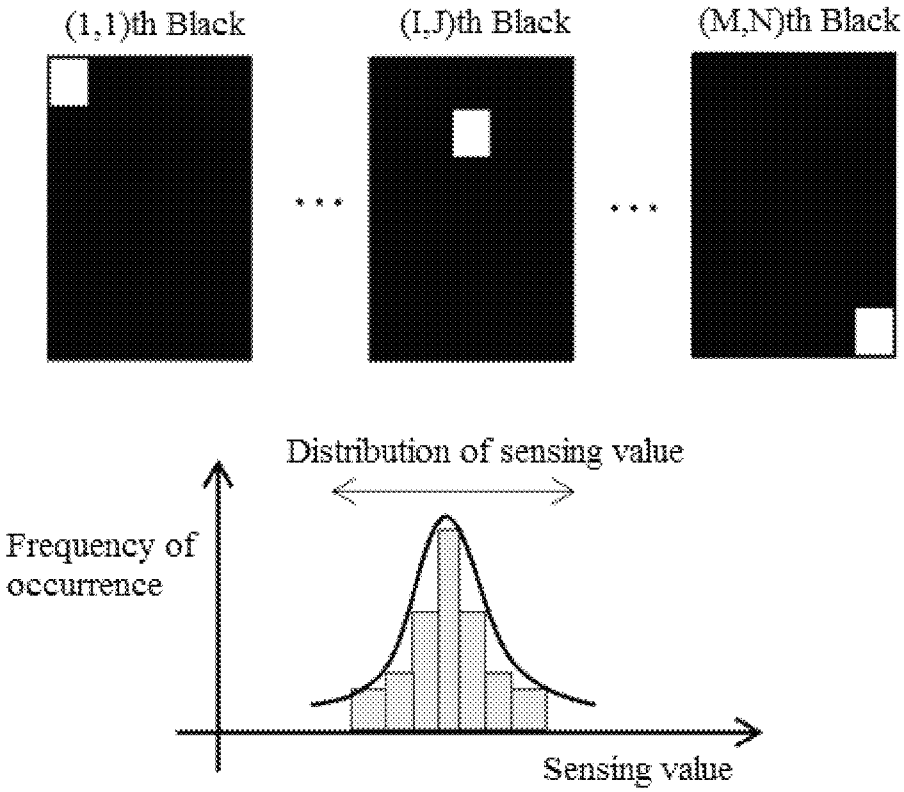
FIG. 13 Prior Art
FIG. 13 is a diagram of distribution of a degradation sensing value using a degradation sensing method according to a comparative example.
Figure 14:
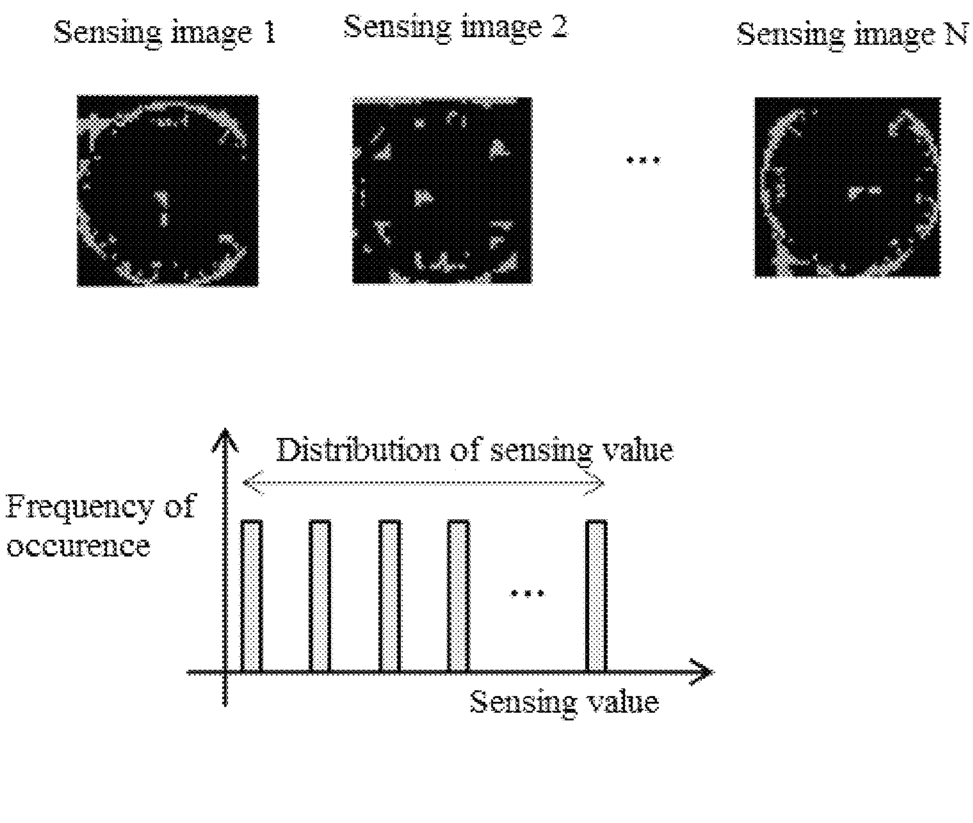
FIG. 14 is a diagram of distribution of a degradation sensing value using a degradation sensing method according to the present disclosure.

FIG. 13 is a diagram of distribution of a degradation sensing value using a degradation sensing method according to a comparative example. FIG. 14 is a diagram of distribution of a degradation sensing value using a degradation sensing method according to the present disclosure.

As shown in FIGS. 13 and 14, all sensed values in the degradation sensing methods according to the comparative example and the present disclosure may correspond to an average degradation level in OLEDs corresponding to pixels included in a sensing image. However, the degradation sensing methods according to the comparative example and the present disclosure may be different in the uniformity of degradation of OLEDs corresponding to pixels included in a sensing image.

When degradation of sensing images is sensed using the degradation sensing method according to the comparative example, highly degraded pixels and less degraded pixels coexist in each sensing image, and sensed values correspond to an average value of degradation levels of these pixels and do not differ between sensing images. That is, as shown in FIG. 13, sensing value distribution between sensing images is not large.

In contrast, because each sensing image using the degradation sensing method according to the present disclosure is an image formed by selecting only pixels corresponding to a constant degradation level in degradation level distribution of an entire panel, a great sensing value of a sensing image may be sensed in order from largest in a value of accumulated data, sensing value distribution between sensing images may increase, and a sensing value difference between the sensing images may be high, and accordingly a degradation compensation algorithm using these values may reduce an error compared with the degradation sensing method according to the comparative example.

The light-emitting display device and the method of sensing degradation thereof according to the disclosures of the present disclosure having the aforementioned features may have the following effects.

According to the present disclosure, because each sensing image is an image formed by selecting only pixels corresponding to a constant degradation level in degradation level distribution of an entire panel, a great sensing value of a sensing image may be sensed in order from largest in a value of accumulated data, sensing value distribution between sensing images may increase, and a sensing value difference between the sensing images may be high, and accordingly a degradation compensation algorithm using these values may reduce an error.

It will be apparent to those skilled in the art that various modifications and variations can be made in the present disclosure without departing from the spirit or scope of the disclosures. Thus, it is intended that the present disclosure cover the modifications and variations of this disclosure provided they come within the scope of the appended claims and their equivalents.

What is claimed is:

1. A light-emitting display device comprising:

a controller operating in a display mode and a sensing mode;

a display panel including a plurality of pixels each including a driving transistor and an organic light-emitting diode and displaying at least one sensing image in the sensing mode; and a sensing unit configured to sense an electrical physical quantity for each panel or for each region in the display panel when the at least one sensing image is displayed on the display panel, wherein the sensing unit includes a voltage/current converter for converting a high potential power voltage into a high potential current, and wherein the sensing unit supplies the high potential power voltage to a high potential power voltage line of the display panel in the display mode, and the high potential current to the high potential power voltage line of the display panel in the sensing mode.

2. The light-emitting display device of claim 1, wherein the driving transistor is driven in a saturation region in the display mode.

3. The light-emitting display device of claim 1, wherein the driving transistor is driven in a linear region in the sensing mode.

4. The light-emitting display device of claim 1, wherein the sensing mode includes a first sensing mode and a second sensing mode.

5. The light-emitting display device of claim 4, wherein, in the first sensing mode, a threshold voltage of the driving transistor is sensed to compensate for the threshold voltage of the driving transistor.

6. The light-emitting display device of claim 4, wherein, in the first sensing mode, an electron mobility of the driving transistor is sensed to compensate for the electron mobility of the driving transistor.

7. The light-emitting display device of claim 4, wherein, in the second sensing mode, a degradation of the organic light-emitting diode is sensed to compensate for the degradation of the organic light-emitting diode.

8. The light-emitting display device of claim 7, wherein an amount of the degradation of the organic light-emitting diode is estimated by sensing the electrical physical quantity of a degradation level of the organic light-emitting diode for each panel or each region within the display panel.

9. The light-emitting display device of claim 8, wherein the electrical physical quantity is voltage or current of a high potential power.

10. The light-emitting display device of claim 4, wherein, in the second sensing mode, selected pixels selected to generate sensing image data are turned on and remaining non-selected pixels are turned off.

11. The light-emitting display device of claim 1, wherein the sensing unit further comprises a first switching device configured to supply the high potential power voltage to the high potential power voltage line of the display panel according to a first control signal in the display mode.

12. The light-emitting display device of claim 11, wherein the sensing unit further comprises a second switching device configured to supply the high potential current converted by the voltage/current converter to the high potential power voltage line according to a second control signal in the sensing mode.

13. The light-emitting display device of claim 12, wherein the sensing unit further comprises an analog-digital converter configured to convert a voltage of the high potential power voltage line of the display panel into a digital signal and to provide the converted digital signal to the controller in the sensing mode.

14. A light-emitting display device comprising:

a display panel including a first potential power voltage line, a second potential power voltage line and a plurality of pixels each including a driving transistor and an organic light-emitting diode; a controller configured to generate at least one sensing image in a sensing mode; and a sensing unit configured to sense a voltage or current of the first potential power voltage line for each panel or for each region in the display panel in a state in which the at least one sensing image is displayed on the display panel, wherein the sensing unit includes a voltage/current converter for converting a high potential power voltage into a high potential current, and wherein the sensing unit supplies the high potential power voltage to a high potential power voltage line of the display panel in a display mode, and the high potential current to the high potential power voltage line of the display panel in the sensing mode.

15. The light-emitting display device of claim 14, wherein the first potential power voltage line supplies the high potential power voltage to the display panel.

16. The light-emitting display device of claim 14, wherein each of the plurality of pixels further includes a first switching transistor being turned on according to a kth scan signal to connect a jth data line to a gate electrode of the driving transistor;

a second switching transistor being turned on according to a kth sensing signal to connect a jth reference voltage line to a source electrode of the driving transistor; and a storage capacitor between the gate electrode and the source electrode of the driving transistor.

17. The light-emitting display device of claim 14, wherein the controller generates the at least one sensing image depending on a size of accumulated image obtained by accumulating image data for each pixel.

18. The light-emitting display device of claim 17, wherein the at least one sensing image comprises N sensing images, wherein the controller generates a first sensing image by selecting pixels from first to kth (k being a natural number) in size of the accumulated image, a second sensing image by selecting pixels from (k+1)th to 2kth in size of the accumulated image, an Nth sensing image by selecting pixels from ((N−1)k+1)th to Nkth in size of the accumulated image.

* * * * *